United States Patent
Kessenich et al.

(10) Patent No.: US 7,251,784 B2
(45) Date of Patent: Jul. 31, 2007

(54) SUPPLYING SUPPLEMENTARY INFORMATION FOR PRINTED BOOKS

(75) Inventors: Diane F. Kessenich, Gulfstream, FL (US); Johanna Bierwirth, Amarillo, TX (US); Brett Clark, New York, NY (US); Kathryn T. Hegeman, Eastport, NY (US)

(73) Assignee: WinslowHouse International, Inc., New York, NY (US)

( * ) Notice: Subject to any disclaimer, the term of this patent is extended or adjusted under 35 U.S.C. 154(b) by 519 days.

(21) Appl. No.: 10/641,186

(22) Filed: Aug. 14, 2003

(65) Prior Publication Data

US 2004/0083200 A1    Apr. 29, 2004

Related U.S. Application Data

(63) Continuation of application No. 09/498,304, filed on Feb. 4, 2000, now abandoned, which is a continuation-in-part of application No. 08/842,952, filed on Apr. 25, 1997, now abandoned, and a continuation-in-part of application No. 08/846,759, filed on Apr. 30, 1997, now Pat. No. 6,034,680.

(51) Int. Cl.
*G06F 3/00* (2006.01)

(52) U.S. Cl. .................. 715/738; 715/733; 715/741; 715/742; 715/501.1; 707/10; 709/217

(58) Field of Classification Search ............... 715/733, 715/738, 741–745, 747, 760, 854, 962, 501.1, 715/512; 707/10; 709/217, 219
See application file for complete search history.

(56) References Cited

U.S. PATENT DOCUMENTS 5,241,671 A    8/1993    Reed et al.
5,309,437 A    5/1994    Perlman et al.
5,353,283 A    10/1994   Tsuchiya
5,408,655 A    4/1995    Oren et al.
5,416,842 A    5/1995    Aziz
5,506,984 A    4/1996    Miller (Continued)

OTHER PUBLICATIONS

Hahn et al., "The Internet Yellow Pages," Osborne McGraw-Hill, 39-42, 88-89, 182-191, and 194195, 1994.

*Primary Examiner*—Lucila X. Bautista
(74) *Attorney, Agent, or Firm*—Akerman Senterfitt

(57) ABSTRACT

A method for supplying supplementary information related to printed books comprises the steps of: distributing a plurality of different printed books having respective content; supplying a common internet web access address together with each one of the plurality of different printed books; making a first web site accessible on the internet at the common address; firstly displaying at the first web site, in response to each internet access of the first web site, a first set of respective hyper links corresponding to each of the different printed books; and, secondly displaying at the first web site, in response to selection of any one of the hyper links on the first web page, a further and respective set of hyper links identifying further web sites having information relevant to and underlying the respective content of the printed book corresponding to the selected hyper link of the first web page. A programmed computer apparatus is a platform for the first web site and comprises a graphical user interface for generating the plurality of hyper links displayed for implementing the method.

18 Claims, 9 Drawing Sheets

U.S. PATENT DOCUMENTS

| | | |
|---|---|---|
| 5,530,852 A | 6/1996 | Meske, Jr. et al. |
| 5,572,643 A | 11/1996 | Judson |
| 5,583,940 A | 12/1996 | Vidrascu et al. |
| 5,583,996 A | 12/1996 | Tsuchiya |
| 5,588,060 A | 12/1996 | Aziz |
| 5,597,307 A | 1/1997 | Redford et al. |
| 5,600,831 A | 2/1997 | Levy et al. |
| 5,602,905 A | 2/1997 | Mettke |
| 5,708,825 A | 1/1998 | Sotomayor |
| 5,754,939 A | 5/1998 | Herz et al. |
| 5,760,771 A | 6/1998 | Blonder et al. |
| 5,778,367 A | 7/1998 | Wesinger, Jr. et al. |
| 5,784,565 A | 7/1998 | Lewine |
| 5,799,157 A | 8/1998 | Escallon |
| 5,932,863 A * | 8/1999 | Rathus et al. .......... 235/462.15 |
| 6,029,195 A | 2/2000 | Herz |
| 6,049,835 A * | 4/2000 | Gagnon ...................... 709/245 |
| 6,055,544 A | 4/2000 | DeRose et al. |
| 6,091,930 A * | 7/2000 | Mortimer et al. ............ 434/362 |
| 6,098,081 A | 8/2000 | Heidorn et al. |
| 6,230,202 B1 | 5/2001 | Lewine |
| 6,964,374 B1 * | 11/2005 | Djuknic et al. ......... 235/462.01 |
| 2003/0040957 A1 * | 2/2003 | Rodriguez et al. ............. 705/14 |
| 2006/0149843 A1 * | 7/2006 | Rhoads et al. .............. 709/227 |

\* cited by examiner

MENU BAR TO ESCAPE TO PREVIOUS SCREENS
68

TO GO TO ACTIVITIES
FOR BOOK 2
*(CLICK HERE)*
71

TO GO TO MUSEUM
WITH TOPICS RELATING TO BOOK 2
*(CLICK HERE)*
72

TO GO TO ART GALLERIES
WITH TOPICS RELATING TO BOOK 2
*(CLICK HERE)*
73

TO GO TO OTHER
DESTINATIONS
WITH TOPICS RELATING TO BOOK 2
*(CLICK HERE)*
74

*FIG. 8*

SUPPLYING SUPPLEMENTARY INFORMATION FOR PRINTED BOOKS

This application is a Continuation of U.S. application Ser. No. 09/498,304, filed Feb. 4, 2000 now abandoned, which is a Continuation-in-Part of U.S. application Ser. No. 08/842,952, filed Apr. 25, 1997, now abandoned, and U.S. application Ser. No. 08/846,759, filed Apr. 30, 1997 now U.S. Pat. No. 6,034,680.

BACKGROUND OF THE INVENTION

1. Field of the Invention

This invention relates to the field of publishing, and in particular, to a confluence of printed and electronic publishing.

2. Description of Related Art

The internet, as part of the world wide web, has as its primary function establishing links between web site browsers and millions of different web sites, each of which can be expected to provide different kinds of information and data. Each of the web sites is a part of the web itself. Books, magazines, journals, newspapers and the like are now widely available at various web sites, under the general category now commonly referred to as electronic publishing. Despite the availability of copies of printed publications on the world wide web, and even the availability of on-line magazines without any corresponding printed versions, there has yet to be a confluence of printed and electronic publishing beyond the mere substitution of one medium for the other.

Indeed, there is a strong feeling among many people that a certain kind of "magic" one can experience curled up in a chair with a good book is utterly lacking in the electronic publishing of the internet, and always will be lacking. As a result, the two media have always lacked, and continue to lack an advantageous common ground which provides readers with the advantages of both media, namely the "magic' of a book in hand and the extraordinary ability of the internet to provide access to sources of information from almost anywhere in the world, or even from an orbit around the world.

The manner in which computer apparatus have been used as sources of information on the internet and as tools for accessing those sources of information, are illustrated by the following patent references.

U.S. Pat. No. 5,600,831 discloses an apparatus with a knowledge base built upon a description logic based knowledge representation system that is implemented using a digital computer and information sources accessed via the Internet communication network. The sources generally are network-based information servers accessed by standard internet communication protocols. A consequence of the very large number of information sites is said to be the need for a world view, and to relate to the contents of the information sources, site descriptions are needed, and to minimize the cost, the site descriptions must be rich enough to express various constraints that enable the system to prune the sources accessed. Web site authors are advised to use retrieval information that will optimize being found.

U.S. Pat. No. 5,572,643 is directed to a web browser with dynamic display of information objects during linking, so that the wasted time during the linking and downloading presents to the user an advertisement, message, or notice rather than the unrecognizable image being formed. When the user browsing the Worldwide Web using a HTML compliant client supporting a graphical user interface in-browser requests to link to a hyper document from a remote server, the waiting period is long so that a message may be presented, preferably related to the web site.

U.S. Pat. No. 5,588,060 is directed to a method and apparatus scheme for internet protocols to provide additional security at the network layer to prevent hackers from interjecting themselves into a data transfer. This is a scheme that is suitable for use with the IP protocol, as well as the proposed replacement protocols CLMP and SIPP. This scheme is for use between a small number of users that communicate with each other.

U.S. Pat. No. 5,530,852 is directed to a computer implemented method and apparatus for automatically sorting through electronic files on the Internet and to form a sub-set of the information. The implementation uses a client server architecture using any number of commercially or publicly available browsers. The computer system could be a workstation, personal computer, or other processing apparatus. The communication uses the functionality provided by hyper transfer protocol HTTP and the uniform resource locators (URLS).

One further use of the internet to consider is that most manuals for computers, peripherals and software are printed with the internet address of the vendor, to facilitate on-line help and the purchase of other products from the vendor.

Notwithstanding the various ways in which information on the internet has been and can be manipulated, accessed, transferred and copied, no system has yet been developed which provides the confluence, that is, the common ground, of printed and electronic media in such a way that a reader can experience the "magic" of a printed book, and in conjunction with that reading, be directed to sources of information and data available on the internet, and specifically keyed to that particular book. The absence of such an advantageous system is particularly egregious in the realm of books for children and young adults. The choices of children and young adults, and the choices of parents on their behalf, are presently limited for the most part to choosing between printed and CD ROM copies of the same books. There is no opportunity to appreciate the advantages of combining complementary sources of paper-printed books and electronically-accessible information and data, particularly in an educational context.

SUMMARY OF THE INVENTION

The inventive arrangements taught herein provide for the first time a confluence of printed and electronic media in such a way that a reader can experience the "magic" of a printed book, and in conjunction with that reading, be directed to sources of information available on the internet, which are specifically keyed to that particular book. The term information is used hereinafter to include information and data of all forms, for example, and without limitation, text, illustrations, pictures, photographs, video, movies, slides, voice, speech, music and sound. The confluence is particularly advantageous in the realm of books for children and young adults. The choices of children and young adults, and the choices of parents on their behalf, are no longer limited to choosing between printed and CD ROM copies of the same books. There is a new opportunity to appreciate the advantages of combining complementary sources of paper-printed books and electronically-accessible information. Moreover, the confluence occurs in a carefully constructed educational context.

A method for supplying supplementary information related to printed books, in accordance with an inventive arrangement, comprises the steps of: distributing a plurality of different printed books having respective content of the printed books; supplying a common internet web access address together with each one of the plurality of different printed books; making a first web site accessible on the internet at the common address; firstly displaying at the first web site, in response to each internet access of the first web site, a first set of respective hyper links corresponding to each of the different printed books; and, secondly displaying at the first web site, in response to selection of any one of the hyper links of the first set, a further and respective set of hyper links identifying further sources having information relevant to and underlying the respective content of the printed book corresponding to the selected hyper link of the first set.

The term content, in the context of describing characteristics of the printed books, is used throughout the specification and claims to include, without limitation, one or more of the following: the story lines of the printed books; the subject matter of the printed books; the nature and style of the printed books; and, the underlying themes of the printed books.

The method can comprise the further step of displaying hyper links in the further and respective set to at least one of the following: museums, art galleries, libraries, colleges, universities, foundations and government administrations and agencies.

A method for supplying supplementary information related to printed books, in accordance with another inventive arrangement, comprises the steps of: distributing a plurality of different printed books having respective content in respective sets of selections adapted for reading by children and reading by young adults, respectively; supplying a common internet web access address together with each one of the plurality of different printed books; making a first web site accessible on the internet at the common address; firstly displaying at the first web site address, in response to each internet access of the first web site, a first set of respective hyper links corresponding to adult-appropriate supplementary information and corresponding to children-and-young-adult-appropriate supplementary information; secondly displaying at the first web site, in response to selection of the hyper link of the first set corresponding to the children-and-young-adult-appropriate supplementary information, a second set of respective hyper links corresponding to each one of the plurality of different printed books; thirdly displaying at the first web site, in response to selection of any one of the hyper links on the second set, a third set of hyper links identifying a first set of further web sites having information relevant to and underlying the respective content of the printed book corresponding to the selected hyper link of the first set; fourthly displaying at the first web site, in parallel with the previous two steps as necessary, in response to selection of the hyper link of the first set corresponding to the adult-appropriate supplementary information, a fourth set of respective hyper links corresponding to each one of the plurality of different printed books and to other books; and, fifthly displaying at the first web site, in response to selection of any one of the hyper links on the fourth set, a fifth set of hyper links identifying further sources, for example web pages, of the first web site and a second set of sources, for example further web sites, having information relevant to and underlying the respective content of the printed book corresponding to the selected hyper link of the fourth set.

The method can further comprise the step of displaying hyper links in the third set to at least one of the following: museums, art galleries, libraries, colleges, universities, foundations and government administrations and agencies.

The method can also further comprise the step of displaying hyper links in the fifth set to at least one of the following: an age-appropriate activity book; titles of related books; and, literary criticism.

The method can also further comprise the step of displaying as part of the first set of respective hyper links, a teacher-appropriate hyper link, a librarian-appropriate hyper link and a parent-appropriate hyper link. This can be associated with the further step of displaying sixth, seventh and eighth sets of hyper links, respectively, for third, fourth and fifth sets of further sources, for example web pages and web sites, appropriate for teachers, librarians and parents, respectively.

A computer apparatus in accordance with still another inventive arrangement, programmed with a routine of instructions stored in a physical medium for manipulating images on a graphical user interface, the interface being adapted to supply supplementary information related to a plurality of different printed books having respective content and distributed with a common internet web site address, comprises: first means for establishing a first internet web site at the commonly distributed internet web site address; second means for displaying at the first web site a first set of respective hyper links corresponding to each one of the plurality of different printed books; third means for enabling an internet link between the first web site and an internet browser accessing the internet web site address; and, fourth means for displaying at the first web site, in response to selection of any one of the hyper links of the first set, a further and respective set of hyper links identifying further sources, for example web sites, having information relevant to and underlying the respective content of the printed book corresponding to the selected hyper link of the first set.

The apparatus can further comprise fifth means for displaying hyper links in the further and respective set to at least one of the following: museums, art galleries, libraries, colleges, universities, foundations and government administrations and agencies.

A computer apparatus, in accordance with yet another inventive arrangement, programmed with a routine of instructions stored in a physical medium for manipulating images on a graphical user interface, the interface being adapted to supply supplementary information related to a plurality of different printed books having respective content and distributed with a common internet web site address, comprises: first means for establishing a first internet web site at the commonly distributed internet web site address; second means for displaying at the first web site address, in response to each internet access of the first web site, a first set of respective hyper links corresponding to adult-appropriate supplementary information and corresponding to children-and-young-adult-appropriate supplementary information; third means for enabling an internet link between the first web site and an internet browser accessing the internet web site address; fourth means for displaying at the first web site, in response to selection of the hyper link of the first set corresponding to the children-and-young-adult-appropriate supplementary information, a second set of respective hyper links corresponding to each one of the plurality of different printed books; fifth means for displaying at the first web site, in response to selection of any one of the hyper links of the second set, a third set of hyper links identifying a first set of further web sites having information relevant to and underlying the respective content of the printed book corresponding to the selected hyper link of the first set; sixth means for displaying at the first web site, in response to selection of the hyper link of the first set corresponding to the adult-appropriate supplementary information, a fourth set of respective hyper links corresponding to each one of the plurality of different printed books and to other books; and, seventh means for displaying at the first web site, in response to selection of any one of the hyper links of the fourth set, a fifth set of hyper links identifying further sources, for example web pages of the first web site, and a second set of sources, for example further web sites, having information relevant to and underlying the respective content of the printed book corresponding to the selected hyper link of the fourth set.

The second displaying means can display, as part of the first set of respective hyper links, a teacher-appropriate hyper link, a librarian-appropriate hyper link and a parent-appropriate hyper link. In this arrangement, the apparatus can further comprise: eighth means for displaying, responsive to selection of the teacher-appropriate hyper link, a sixth set of hyper links appropriate for teachers; ninth means for displaying, responsive to selection of the librarian-appropriate hyper link, a seventh set of hyper links appropriate for librarians; and, tenth means for displaying, responsive to selection of the parent-appropriate hyper link, an eighth set of hyper links appropriate for parents.

BRIEF DESCRIPTION OF THE DRAWINGS

FIG. 8 is an exemplary display screen defining a communication path of common activities for teacher, librarian, parent, child and young adult internet browsers.

DETAILED DESCRIPTION OF THE PREFERRED EMBODIMENTS

Figure 1:
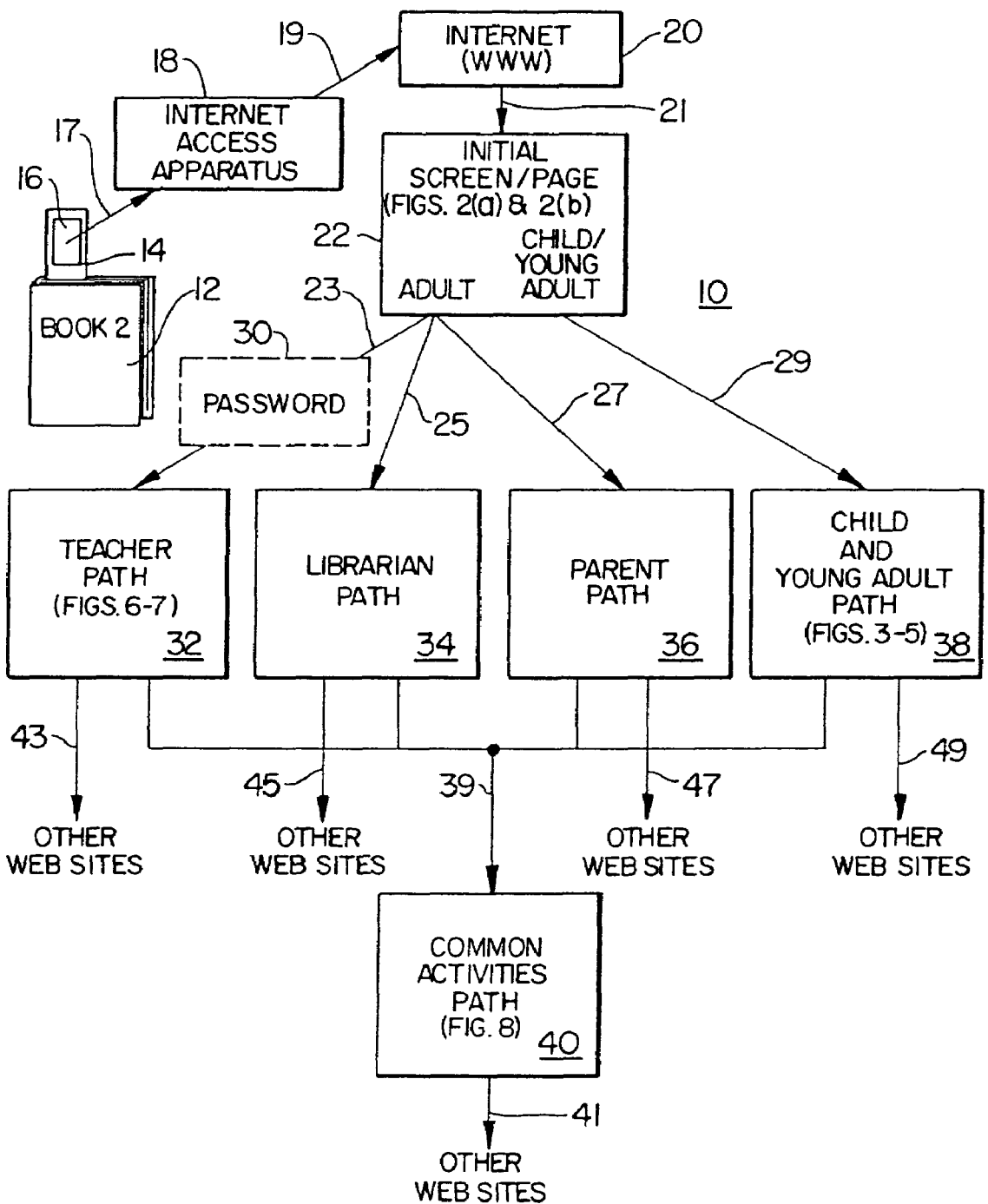
FIG. 1 is a block diagram, in the nature of a flow chart or path map, useful for explaining the various information flow paths according to the inventive arrangements taught herein, by which supplementary information related to a printed book can be supplied to an internet browser.

A method for supplying supplementary information related to printed books, in accordance with an inventive arrangement, is illustrated in FIG. 1. Initially, a plurality of different printed books having respective content in respective sets of selections adapted for reading by children and reading by young adults, respectively, are distributed. A book entitled BOOK 2 is shown for purposes of illustration. A common internet web access address 16 is supplied together with each one of the plurality different printed books, for example in the form of a book mark 14, as shown.

Figure 9:
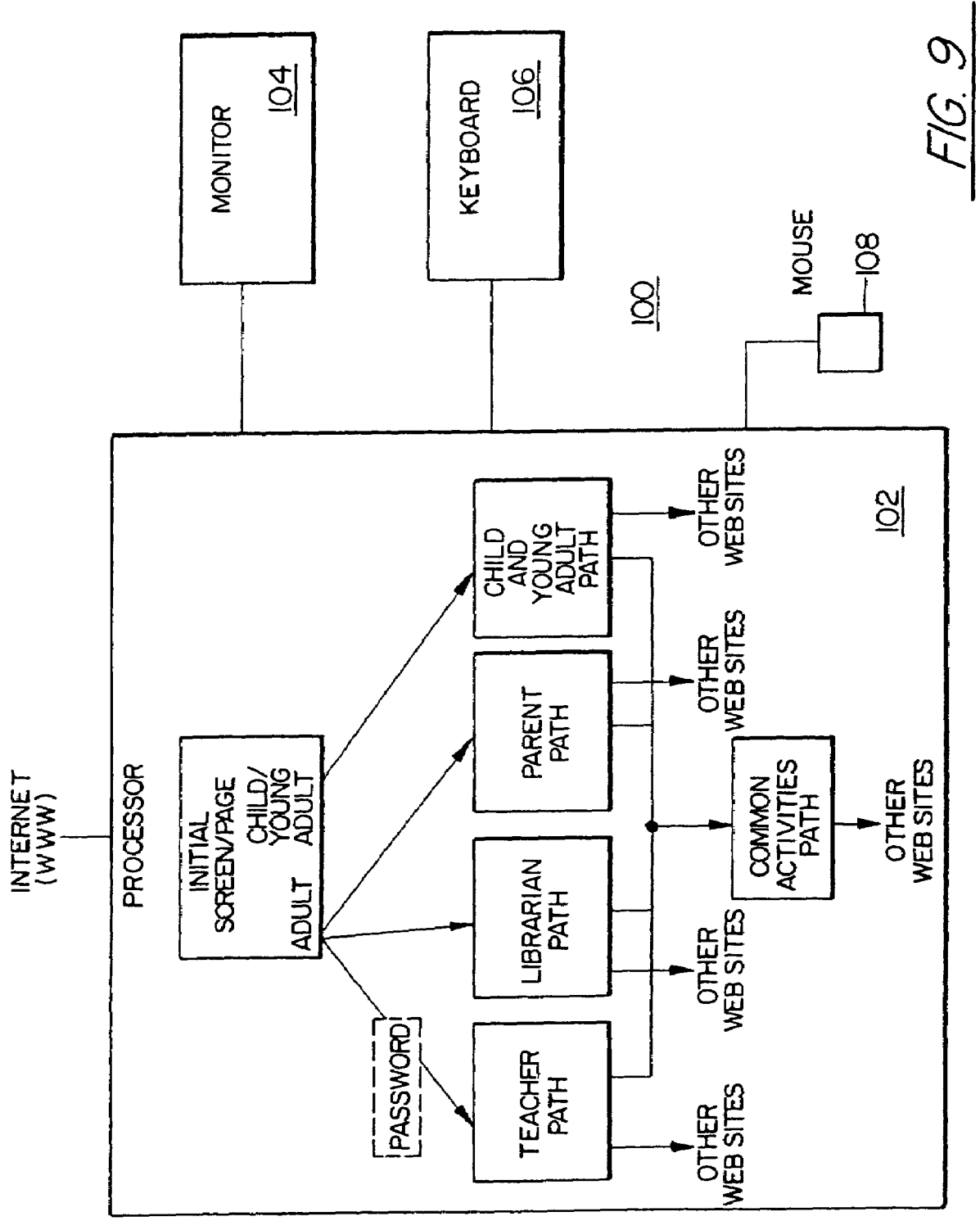
FIG. 9 is a block diagram of a computer programmed for establishing a web site and manipulating images on a graphical user interface, as illustrated in FIGS. 2-8.

A first web site 10 accessible on the internet is made available at the common address. The web site 10 can be established by a computer 100, such as illustrated in FIG. 9. The web site 10 can be accessed and viewed on an internet apparatus 18, which can be a computer, a television receiver, a television receiver set top box, a video game apparatus, and the like. Arrow 17 represents the common web site address which is used in programming the apparatus 18 to communicate with the internet, also referred to as the world wide web (WWW), by a communications link 19. The communications link 19 may be, for example, a telephone modem, a cable modem, an ISDN line, and the like.

A first screen or web page 22 is displayed first at the first web site address, in response to each internet access of the first web site 10 by hyper link 21. The first web page 22 has a first set of respective hyper links 23, 25, 27 and 29 corresponding to adult-appropriate supplementary information related to the particular book, for example BOOK 2, and corresponding to children-and-young-adult-appropriate supplementary information related to the particular book, for example BOOK 2. Hyper link 23 leads to an information path 32 of subsequent web pages with supplementary information appropriate for teachers. It is possible to limit access to the teacher path 32 by using a password protocol 30, shown by a dashed line to indicate an optional aspect of the inventive arrangement. Hyper link 25 leads to an information path 34 of subsequent web pages with supplementary information appropriate for librarians. Hyper link 27 leads to an information path 36 of subsequent web pages with supplementary information appropriate parents. Hyper link 29 leads to an information path 38 of subsequent web pages with supplementary information appropriate for children and young adults.

Each one of the teacher, librarian, parent and child and young adult paths can have further sets of hyper links, leading to other web pages of the first web site 10 or leading to further web sites. Each one of the teacher, librarian, parent and child and young adult paths can also have a common hyper link 39, for example, to a common activities path 40, related to the particular book, for example BOOK 2. The common activities path 40 has at least one hyper link, and preferably plurality of hyper links 41 to other web sites having supplementary information related to the particular book, for example BOOK 2.

The teacher path 32 has at least one hyper link, and preferably a plurality of hyper links 43 to other web sites having supplemental information related to the particular book, for example BOOK 2. The librarian path 34 has at least one hyper link, and preferably a plurality of hyper links 45 to other web sites having supplemental information related to the particular book, for example BOOK 2. The parent path 36 has at least one hyper link, and preferably a plurality of hyper links 47 to other web sites having supplemental information related to the particular book, for example BOOK 2. The child and young adult path 38 has at least one hyper link, and preferably a plurality of hyper links 49 to other web sites having supplemental information related to the particular book, for example BOOK 2. The child and young adult path can also include a hyper link to a story hour, which enables the web site browser to hear the story or a related story, in its entirety, or serialized by chapter. Illustrations can also be provided. The teacher path 32 has at least one hyper link, and preferably a plurality of hyper links 43 to other web sites having supplemental information related to the particular book, for example BOOK 2.

The hyper links to other sources of information can include, without limitation, at least one and preferably a plurality of hyper links to the following: an activity book, an age-appropriate activity book; titles of related books, literary criticism, museums, art galleries, libraries, colleges, universities, foundations and government administrations and agencies. It will be appreciated that some of these hyper links will be hyper links to other web pages of the first web site 10 and others will be hyper links to other web sites. It will also be appreciated that some of these hyper links will be more appropriate to some of the paths than to others of the paths. It will further be appreciated that some of these hyper links will be appropriate to all of the paths.

Figure 2A:
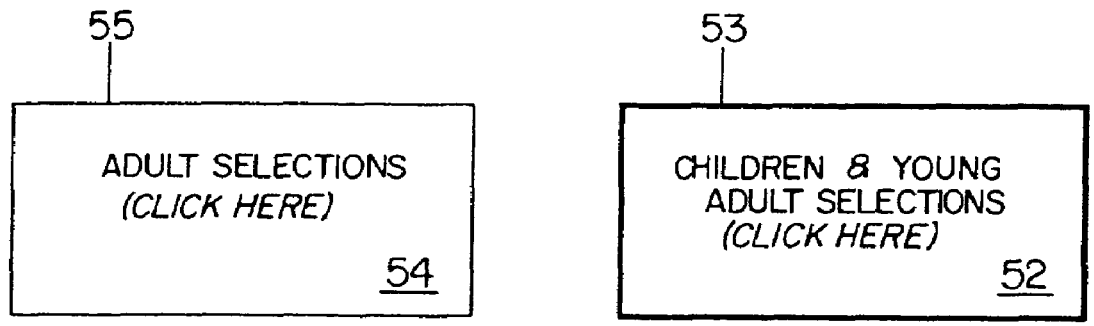
FIGS. 2(a) and 2(b) each show an exemplary initial display screen according to the inventive arrangements for initiating communication with an internet browser.
Figure 2B:
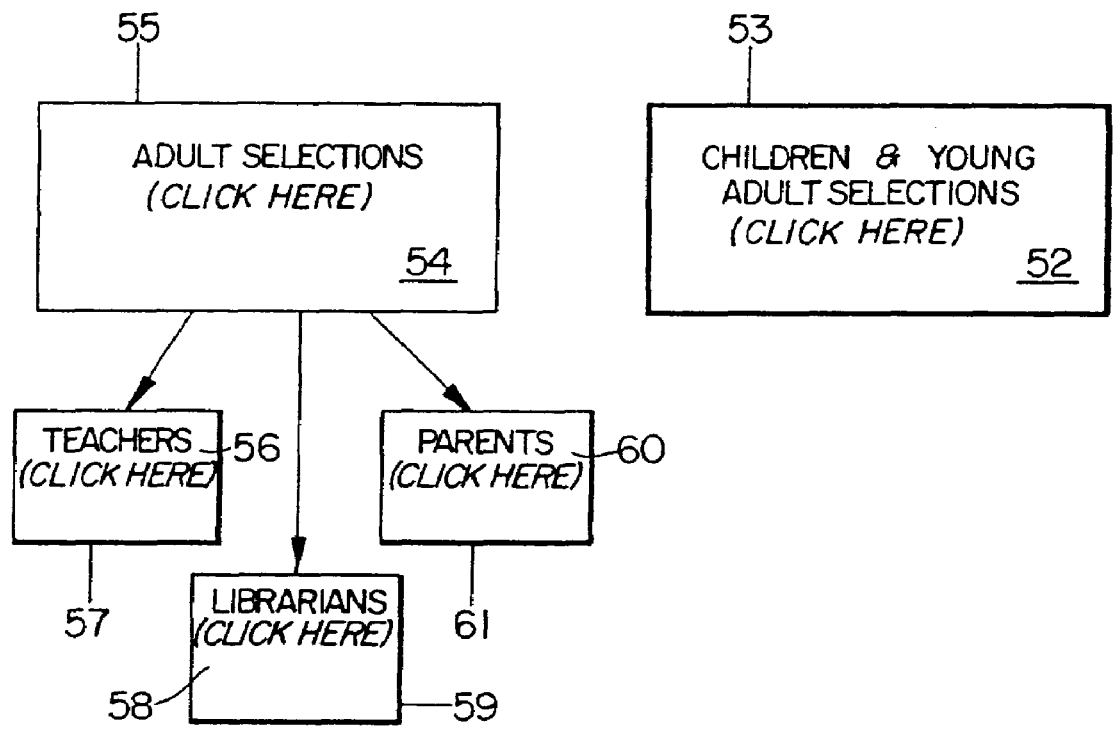

The initial screen or page 22, which may also be thought of as a common log-on path, is shown in more detail and in different states in FIGS. 2(a) and 2(b). The initial screen or page 22 preferably appears in response to accessing the common internet address provided with the printed book, for example BOOK 2. Initially, there are two possible selections: a Children and Young Adults selection box 52 and an Adults selection box 54.

Figure 3:
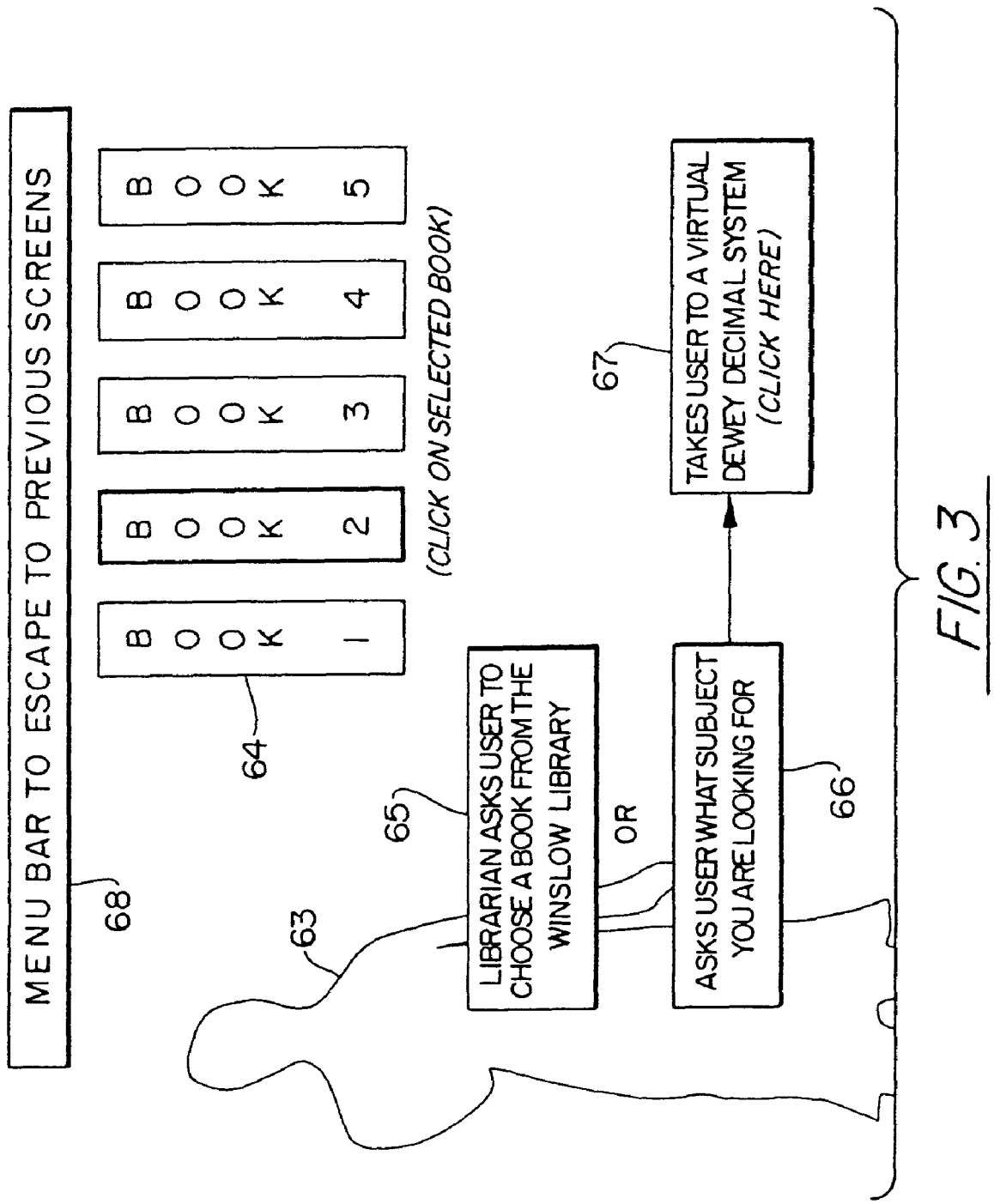
FIGS. 3, 4 and 5 are exemplary, successive display screens defining a communication path for child and young adult internet browsers.
Figure 4:
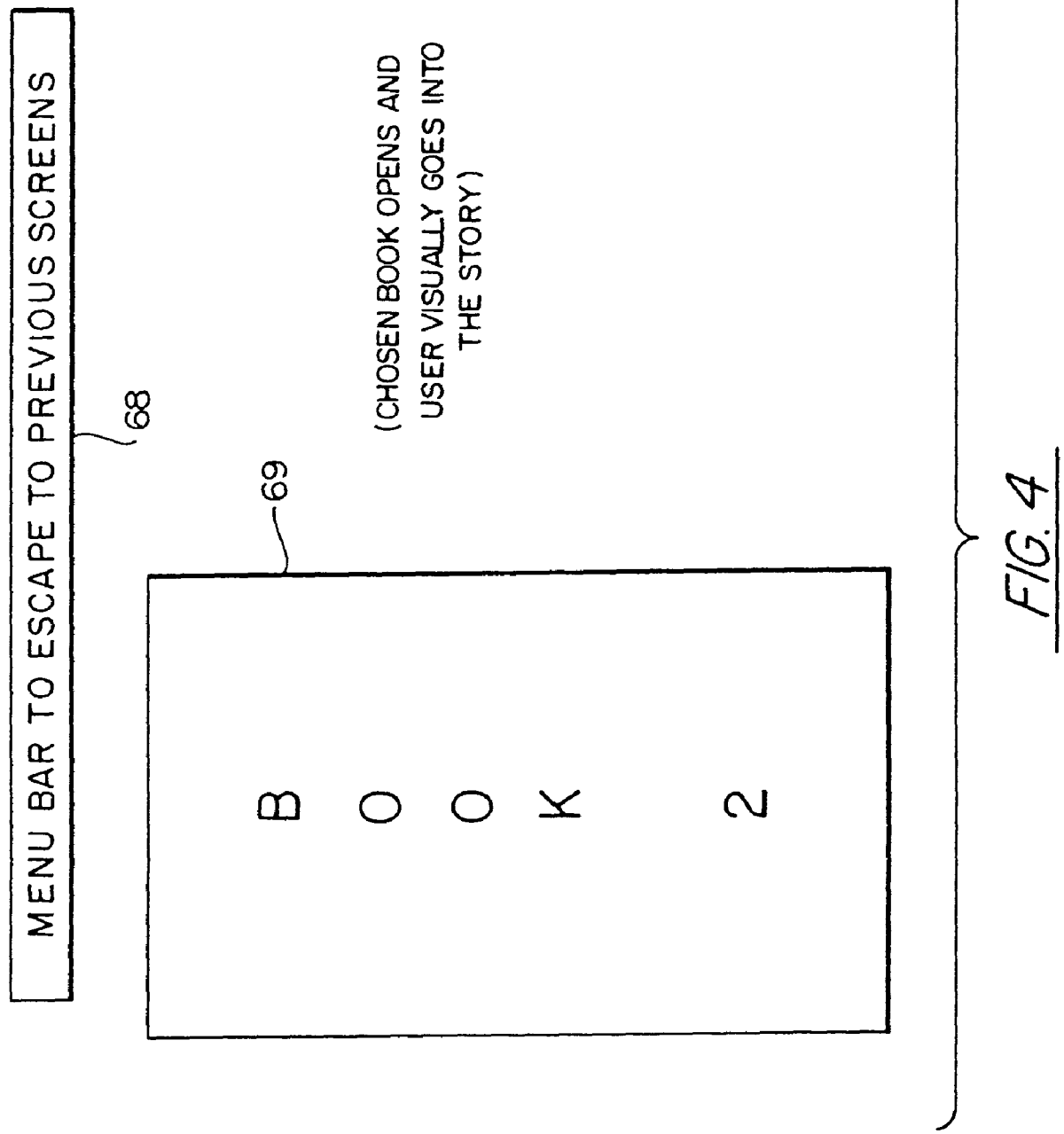
Figure 5:
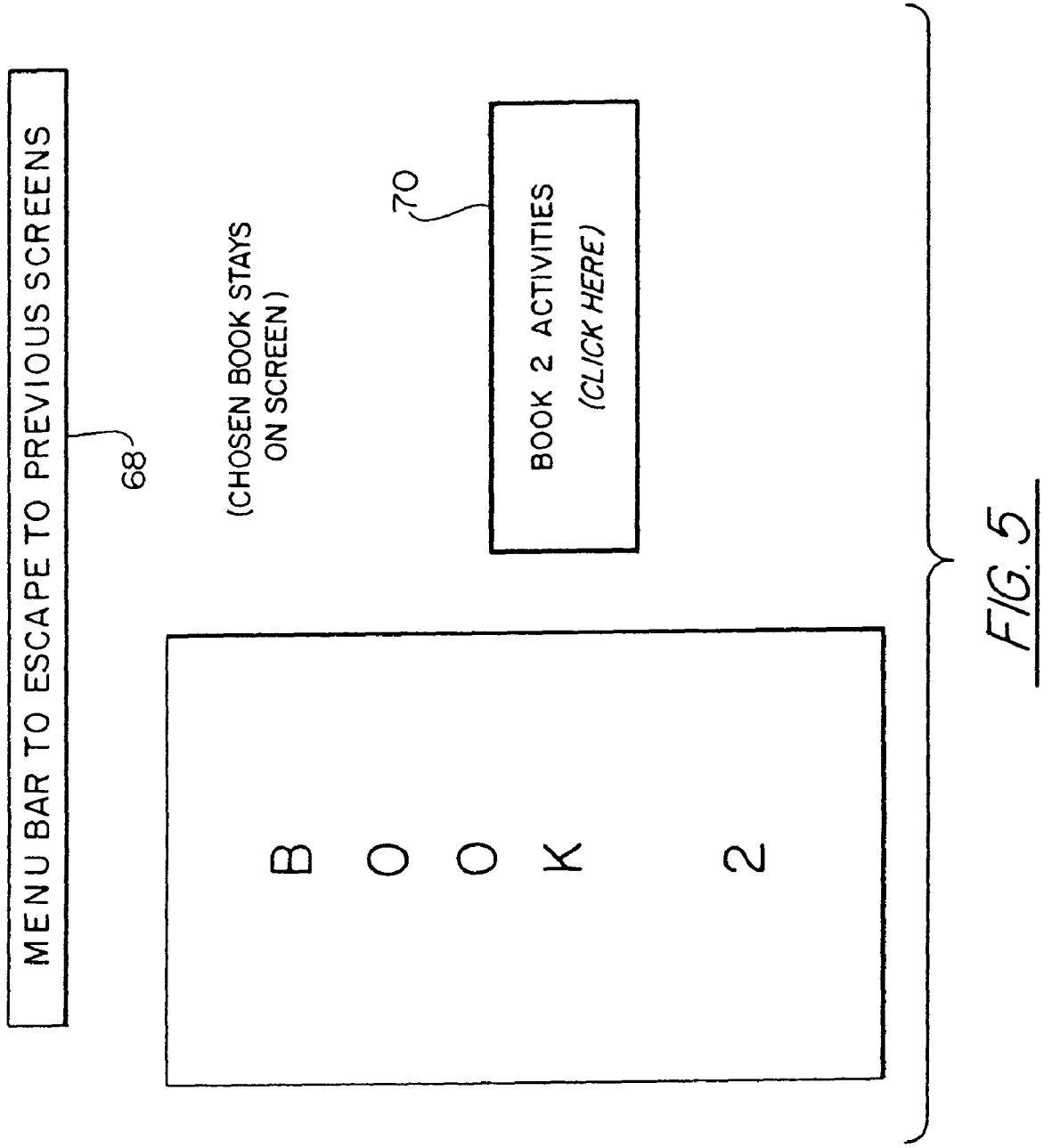

A mouse click, or the like, on the Children and Young Adults box 52, shown with a thicker border 53 in FIG. 2(a) than in FIG. 2(b), initiates a hyper link jump to the first screen or page of the child and young adult path 38, shown in FIG. 3. Further screens or pages of the child and young adult path are shown in FIGS. 4 and 5.

A mouse click, or the like on the Adults box 54, shown with a thicker border in FIG. 2(b) than in FIG. 2(a), initiates a display on the same web page of a Teachers selection box 56 having a border 57, a Librarians selection box 58 having a border 59 and a Parents selection box 60 having a border 61. The Teachers, Librarians and Parents selection boxes are used for selecting between the teacher, librarian and parent paths. Further selection of the Teacher box, shown with a thicker border than the Librarians and Parents selections boxes, initiates a hyper link jump to the first screen or page of the teacher path 32, shown in FIG. 6. A further screen or page of the teacher path is shown in FIG. 7. The Adult related selection boxes 56, 58 and 60 can alternatively be shown in grey, or other dimmed format, to indicate that those choices can be made, but are not available until the Adults box 54 has first been selected.

Alternatively, selection of the Teachers box 56 can initiate a hyper link jump to the password protocol box 30, not separately illustrated. Satisfaction of the password protocol would result in a jump to the first screen or page of the teacher path. The password would be made available to teachers in the teachers' versions of the distributed books or upon special request to the administrators of the first web site.

With reference to FIG. 3, an image 63 of a librarian and an image 64 of a set of books can be illustrated, the latter for example as a book case. The librarian can offer an audio prompt, supplementing the visual message boxes 65 and 66, to select one of the books 64 or to enter a virtual Dewey Decimal indexing system by selecting box 67, to look for books on other topics. Selecting the virtual Dewey Decimal system can initiate a hyper link jump to another web site offering such a data base, if the data base is not available at the first web site. Selecting one of the books, for example BOOK 2, can initiate a jump to the screen or page shown in FIG. 4. Selecting the Menu Bar box 68 provides links back to previous pages.

With reference to FIG. 4, the selection of BOOK 2 on the screen or page of FIG. 3 can initiate a visual presentation 69 of each page and illustration of BOOK 2 in order, at a rate which is a bit too fast to read, but is slow enough for the younger internet user to be well reminded of the contents of the book. At the conclusion of this quick book presentation, and as shown in FIG. 5, a selection box 70 is then displayed, which can be activated to jump by a hyper link to an activities screen or page appropriate for BOOK 2. An activities screen or page can be as shown in FIG. 8.

FIG. 8 also represents the common activities path 40. A selection box 71 provides a link to a series of further web pages displaying an activity or activity book keyed to BOOK 2. A selection box 72 provides a hyper link to a further web page of hyper links to museums and/or a direct hyper link to the web site of a museum. If BOOK 2 is about dinosaurs, one or more hyper links to museums of natural history would be provided. A selection box 73 provides a hyper link to a further web page of hyper links to art galleries and/or a direct hyper link to the web site of an art gallery. A selection box 74 provides hyper links to a further web page of hyper links to other kinds of destinations and/or a direct hyper link to the web site of such other destination.

Figure 6:
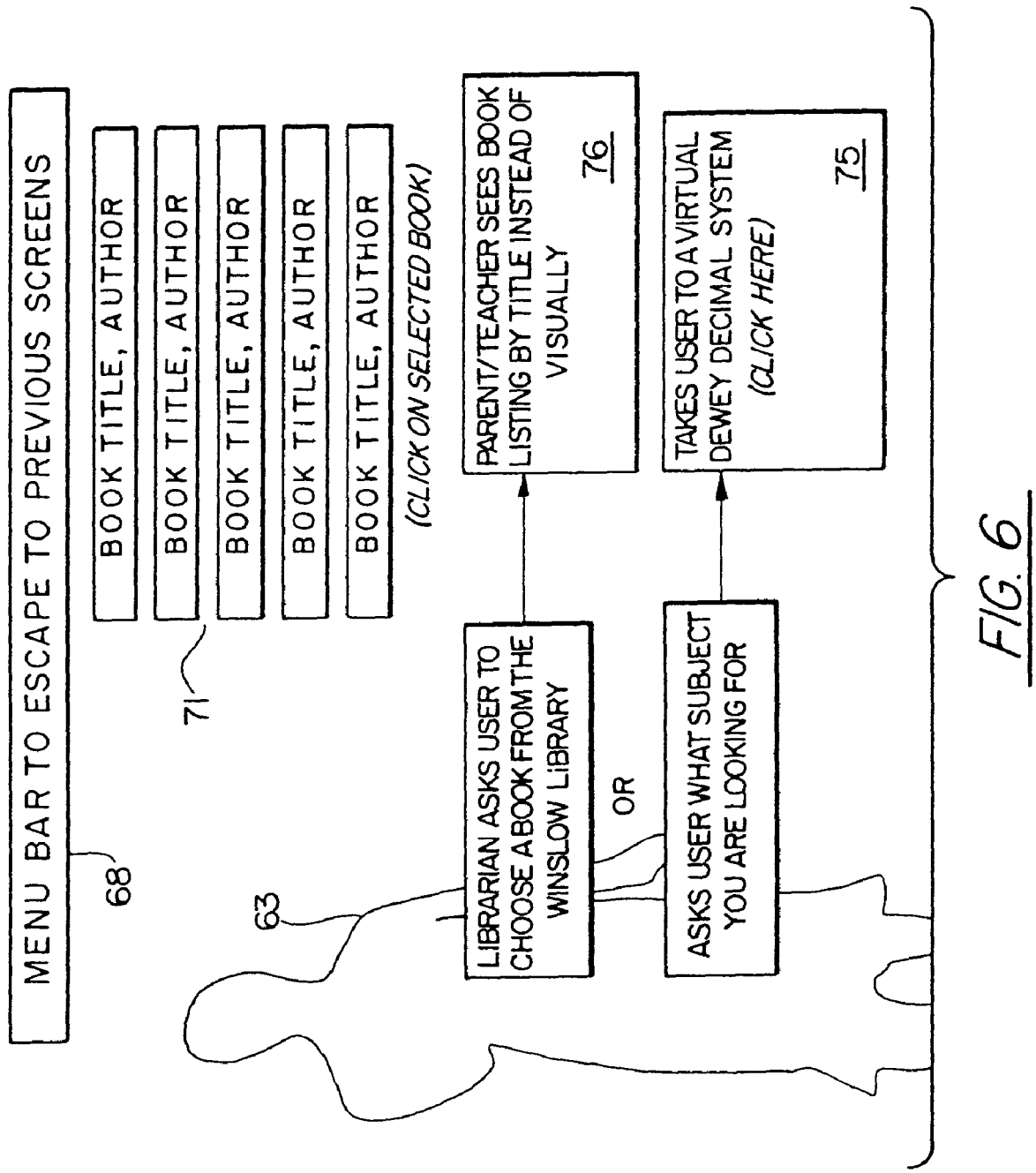
FIGS. 6 and 7 are exemplary, successive display screens defining a communication path for teacher internet browsers.
Figure 7:
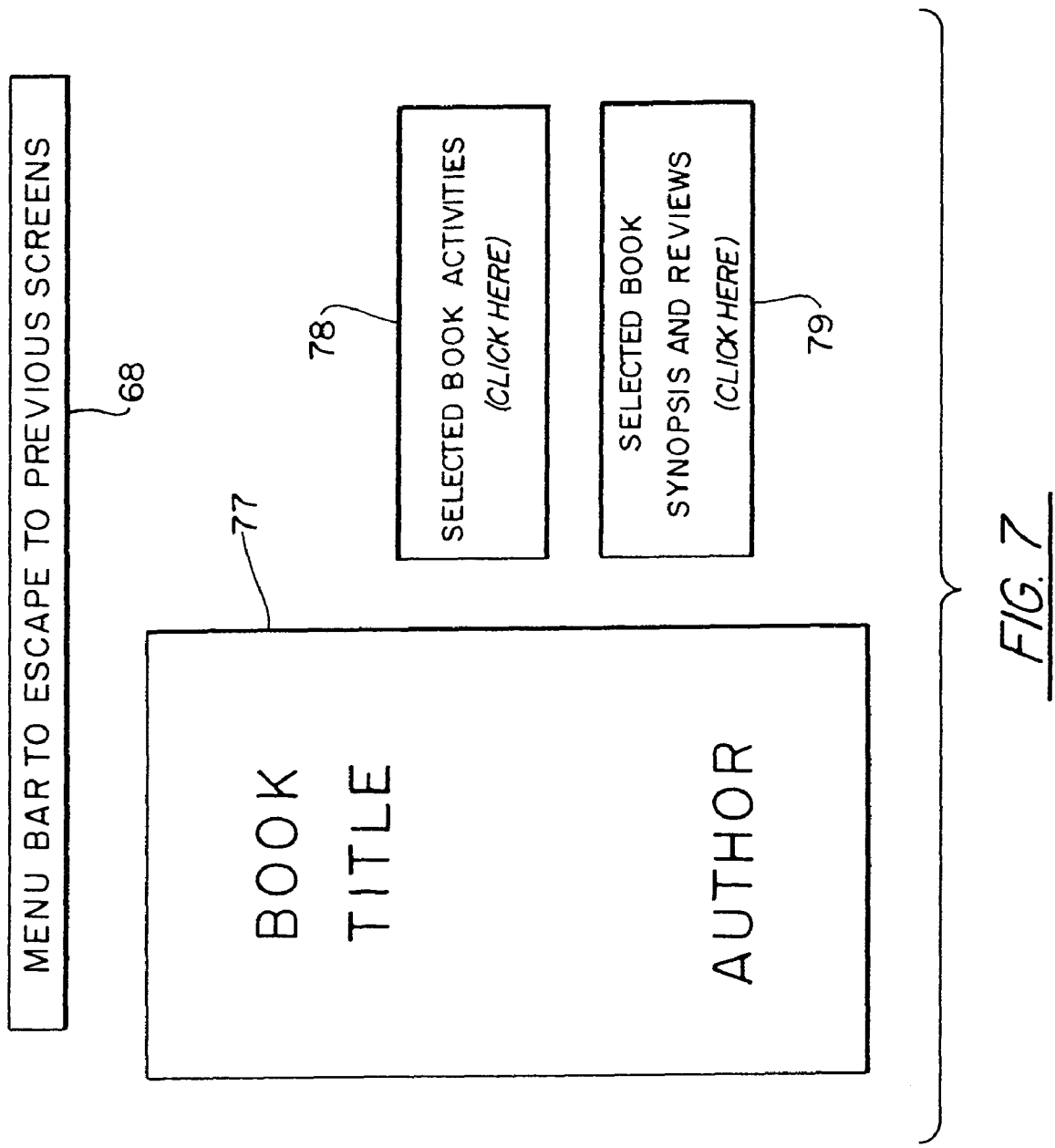

The teacher path 32 is further illustrated by the screens or pages shown in FIGS. 6-7. With reference to FIG. 6, the screen or page can also utilize the image 63 of the librarian, which provides an audio prompt to activate one of the selection boxes. A set of selection boxes 74 for the set of books, including the selected book, is one alternative. A selection box 75 provides a link to a virtual Dewey Decimal system, as in the screen or page shown in FIG. 3. A selection box 76 enables teachers and/or parents to see book listings by title, instead of by icon.

Selection of a book title, from either display format, provides a hyper link to a page or screen as shown in FIG. 7. A picture 77 of the cover of the selected book is displayed as a reference. In a presently preferred embodiment, teachers will have access to a full readable copy of the book and/or a synopsis of the book, which can be accessed by clicking on the cover, and then clicking on each page and/or illustration in sequence. A selection box 78 can provide a hyper link to a further web page of activities related to the selected book, for example, as might be appropriate for an entire classroom. Alternatively, hyper links to other web sites can also be provided. A selection box 79 provides hyper links, to further web pages or to other web sites, of one or more selected book synopses and/or literary reviews.

The librarian path 34 and the parent path 36 can overlap in part with the teacher path 32 and can overlap in part with the child and young adult path 38. Accordingly, it is believed to be unnecessary to illustrate the librarian and parent paths with further screens or pages. In any event, the method and apparatus of the inventive arrangements advantageously lend themselves to adaptation if any or all of the divisions between the various adult paths prove inconvenient or impractical or unnecessary.

The method can further comprise the step of displaying a special log on screen, or displaying a hyper link to the special log on screen, which provides an optional opportunity for the web site browser to provide such personal information as name, age and birthday. This information can be used for a number of purposes. One purpose is to tailor the hyper links of the child and young adult path, for example, to related information and data which is also age appropriate. A second purpose is to tailor the hyper links of the child and young adult path, for example, to include previous hyper links to what appear to be favorite local web pages or other web sites, or to include hyper links to other web sites of particular content related to previously chosen hyper links. A third purpose is to tailor the hyper links of the teacher or parent path, for example, to include links to other books of related content or authorship, and further, to provide hyper links to information identifying libraries and retail establishments where such other books can be borrowed or purchased. A fourth purpose is to tailor the hyper links of the respective paths to include new sources of information and data which have been added since the web site browser's last visit to the first web site.

A computer apparatus 100 in accordance with still another inventive arrangement, programmed with a routine of instructions stored in a physical medium for manipulating images on a graphical user interface, is shown in block diagram form in FIG. 9. The interface is adapted to supply supplemental information related to a plurality of different printed books having respective content and distributed with a common internet web site address. The computer apparatus comprises a platform for establishing the first internet web site 10 at the commonly distributed internet web site address. The computer apparatus 100 comprises a central processor 102, a monitor 104, a keyboard 106 and a mouse 108. Other input/output devices can be utilized. The computer apparatus is linked to the internet and becomes a part of the world wide web. The computer processor 102 is programmed with a routine of instructions stored in a physical medium, for example a hard drive and/or a random access memory. The programming is illustrated diagrammatically by the path map of FIG. 1.

What is claimed is:

1. A method for supplying supplementary information related to printed books, comprising the steps of:
    (A.) distributing a plurality of different printed books having respective content, wherein distributing a plurality of different printed books comprises providing a bookmark in each printed book distributed;
    (B.) supplying a common internet web access address together with each one of said plurality of different printed books, wherein the common internet web access address is provided on the bookmark in each printed book distributed;
    (C.) making a first web site accessible at said common internet web access address;
    (D.) firstly displaying at said first web site, in response to each internet access of said first web site, a first set of respective hyper links corresponding to each of said different printed books, wherein a first portion of said first set comprises at least one hyper link to information suitable for a predetermined class of users, wherein a second portion of said first set comprises at least one hyper link to other information suitable for a different predetermined class of users, and wherein a third portion of said first set comprises a hyper link to common information suitable for all users; and,
    (E.) secondly displaying at said first web site, in response to selection of any one of said hyper links of said first set, a further and respective set of hyper links identifying further web sites having information relevant to and underlying said respective content of said printed book corresponding to said selected hyper link of said first set;
    wherein information suitable for at least one predetermined class of users is restricted to particular users who access information using a passcode provided on the bookmark to each particular user who verifies membership in a corresponding predetermined class of users, the particular user verifying membership in the corresponding predetermined class of users by presenting predetermined personal information pertaining to the particular user to a third party.

2. The method of claim 1, comprising the step of (F.) displaying hyper links in said further and respective set to at least one of the following: museums, art galleries, colleges, universities, foundations and government administrations and agencies.

3. A method for supplying supplementary information related to printed books, comprising the steps of:
    (A.) distributing a plurality of different printed books having respective content in respective sets of selections adapted for reading by children and reading by young adults, respectively, wherein distributing a plurality of different printed books comprises providing a bookmark in each printed book distributed;
    (B.) supplying a common internet web access address together with each one of said plurality of different printed books, wherein the common internet web access address is provided on the bookmark in each printed book distributed;
    (C.) making a first web site accessible at said common internet web access address;
    (D.) firstly displaying at said first web site address, in response to each internet access of said first web site, a first set of respective hyper links, wherein a first portion of said first set comprises at least one hyper link to adult-appropriate supplementary information, wherein a second portion of said first set comprises at least one hyper link to children-and-young-adult-appropriate supplementary information, and wherein a third portion of said first set comprises at least one hyper link to common information suitable for all users, wherein access to said adult-appropriate supplementary information is restricted to particular users who enter a passcode provided to the particular users after each particular user verifies the particular user's age by presenting personal information pertaining to the particular user to a third party;
    (E.) secondly displaying at said first web site, in response to selection of said at least one hyper link to said children-and-young-adult-appropriate supplementary information, a second set of respective hyper links corresponding to each one of said plurality of different printed books;
    (F.) thirdly displaying at said first web site, in response to selection of any one of said hyper links on said second web page, a third set of hyper links identifying a first set of further web sites having information relevant to and underlying said respective content of said printed book corresponding to said selected hyper link of said first set;
    (G.) fourthly displaying at said first web site, in response to selection of said at least one hyper link to said adult-appropriate supplementary information, a fourth set of respective hyper links corresponding to each one of said plurality of different printed books and to other books; and,
    (H.) fifthly displaying at said first web site, in response to selection of any one of said hyper links of said fourth set, a fifth set of hyper links identifying further web pages of said first web site and a second set of further web sites having information relevant to and underlying said respective content of said printed book corresponding to said selected hyper link of said fourth set.
    (I.) sixthly displaying at said first web site, in response to selection of said at least one hyper link to said common information, a sixth set of respective hyper links corresponding to each of said plurality of different printed books;
    (J.) seventhly displaying at said first web site, in response to selection of any one of hyper links of said sixth set of hyper links identifying further web pages of said first web site and a third set of further web sites having information relevant to and underlying said respective content of said printed book corresponding to said selected hyper link of said fith set.

4. The method of claim 3, comprising the step of (K.) displaying hyper links in said third set to at least one of the following: museums, art galleries, colleges, universities, foundations and government administrations and agencies.

5. The method of claim 4, comprising the step of (L.) displaying hyper links in said fifth set to at least one of the following: an age-appropriate activity book; titles of related books; and, literary criticism.

6. The method of claim 3, comprising the step of (M.) displaying hyper links in said fifth set to at least one of the following: an age-appropriate activity book; titles of related books; and, literary criticism.

7. The method of claim 3, wherein said step (D.) includes displaying as part of said first set of respective hyper links, a fourth portion of said first set comprising at least one teacher-appropriate hyper link, a fifth portion of said first set comprising at least one librarian-appropriate hyper link, and a sixth portion of said first set comprising at least one parent-appropriate hyper link, wherein access to teacher-appropriate and librarian-appropriate supplementary information is restricted to particular users who enter a passcode provided to the particular users after each particular user verifies the user's status as a teacher or librarian by presenting personal information pertaining to the particular user to a third party.

8. The method of claim 7, comprising the further step of (N.) displaying seventh, eighth, and ninth sets of hyper links responsive to selection of said teacher-appropriate, said librarian-appropriate and said parent-appropriate hyper links, respectively, to respective sources of further information appropriate for teachers, librarians and parents, respectively.

9. The method of claim 8, comprising the further step of interposing a password protocol for access to said teacher-appropriate set of hyper links.

10. A computer apparatus programmed with a routine of instructions stored in a physical medium for manipulating images on a graphical user interface, said interface being adapted to supply supplemental information related to a plurality of different printed books having respective content and distributed with a common internet web site address provided on a bookmark placed in each of the printed books distributed, said computer comprising: first means for establishing a first internet web site at said common internet web site address; second means for displaying at said first web site a first set of respective hyper links corresponding to each one of said plurality of different printed books, wherein a first portion of said first set comprises at least one hyper link to information suitable for a predetermined class of users, wherein a second portion of said first set comprises at least one hyper link to other information suitable for a different predetermined class of users, and wherein a third portion of said first set comprises a hyper link to common information suitable for all users; third means for enabling an internet link between said first web site and an internet browser accessing said internet web site address; and, fourth means for displaying at said first web site, in response to selection of any one of said hyper links on said first web page, a further and respective set of hyper links identifying further sources having information relevant to and underlying said respective content of said printed book corresponding to said selected hyper link of said first set wherein information suitable for at least one predetermined class of users is restricted to particular users who access information using a passcode provided to each particular user who verifies membership in a corresponding predetermined class of users, the particular user verifying membership in the corresponding predetermined class of users by presenting predetermined personal information pertaining to the particular user to a third party.

11. The apparatus of claim 10, further comprising fifth means for displaying hyper links in said further and respective web page to at least one of the following: museums, art galleries, colleges, universities, foundations and government administrations and agencies.

12. A apparatus programmed with a routine of instructions stored in a physical medium for manipulating images on a graphical user interface, said interface being adapted to supply supplemental information related to a plurality of different printed books having respective content and distributed with a common internet web site address provided on a bookmark placed in each of the printed books distributed, said computer comprising: first means for establishing a first internet web site at said common internet web site address; second means for displaying at said first web site address, in response to each internet access of said first web site, a first set of respective hyper links, wherein a first portion of said first set comprises at least one hyper link to adult-appropriate supplementary information, wherein a second portion of said first set comprises at least one hyper link to children-and-young-adult-appropriate supplementary information, and wherein a third portion of said first set comprises a hyper link to common information suitable for all users; third means for enabling an internet link between said first web site and an internet browser accessing said internet web site address; fourth means for displaying at said first web site, in response to selection of said at least one hyper link to said children-and-young-adult-appropriate supplementary information, a second set of respective hyper links corresponding to each one of said plurality of different printed books; fifth means for displaying at said first web site, in response to selection of any one of said hyper links of said second set, a third set of hyper links identifying a first set of further sources of information relevant to and underlying said respective content of said printed book corresponding to said selected hyper link of said first set; sixth means for displaying at said first web site, in response to selection of said at least one hyper link to said adult-appropriate supplementary information, a fourth set of respective hyper links corresponding to each one of said plurality of different printed books and to other books; seventh means for displaying at said first web site, in response to selection of any one of said hyper links of said fourth set, a fifth set of hyper links identifying further web pages of said first web site and a second set of further sources having information relevant to and underlying said respective content of said printed book corresponding to said selected hyper link of said fourth set; and eighth means for displaying at said first web site, in response to selection of said at least one hyper link to said common information, a sixth set of respective hyper links corresponding to each one of said plurality of different printed books and to other books, and ninth means for displaying at said first web site, in response to selection of any one of said hyper links of said sixth set, a seventh set of hyper links identifying further web pages of said first web site and a third set of further sources having information relevant to and underlying said respective content of said printed book corresponding to said selected hyper link of said sixth set;
    wherein access to said adult-appropriate supplementary information is restricted to particular users who enter a passcode provided to the particular users after each particular user verifies the particular user's age by presenting personal information pertaining to the particular user to a third party.

13. The apparatus of claim 12, wherein second displaying means displays, as part of said first set of respective hyper links, a teacher-appropriate hyper link, a librarian-appropriate hyper link and a parent-appropriate hyper link, and wherein access to said teacher-appropriate and librarian-appropriate supplementary information is restricted to particular users who enter a passcode provided to the particular users after each particular user verifies the user's status as a teacher or librarian by presenting personal information pertaining to the particular user to a third party.

14. The apparatus of claim 13, further comprising tenth means for displaying, responsive to selection of said teacher-appropriate hyper link, an eighth set of hyper links appropriate for teachers.

15. The apparatus of claim 14, further comprising means for interposing a password protocol for access to said eighth set of teacher-appropriate hyper links.

16. The apparatus of claim 13, further comprising tenth means for displaying, responsive to selection of said librarian-appropriate hyper link, an eighth set of hyper links appropriate for librarians.

17. The apparatus of claim 13, further comprising tenth means for displaying, responsive to selection of said parent-appropriate hyper link, an eighth set of hyper links appropriate for parents.

18. The apparatus of claim 13, further comprising:
    tenth means for displaying, responsive to selection of said teacher-appropriate hyper link, an eighth set of hyper links appropriate for teachers; eleventh means for displaying, responsive to selection of said librarian-appropriate hyper link, a ninth set of hyper links appropriate for librarians; and,
    twelfth means for displaying, responsive to selection of said parent-appropriate hyper link, an tenth set of hyper links appropriate for parents.

\* \* \* \* \*